US012789903B2

(12) United States Patent
Carl

(10) Patent No.: US 12,789,903 B2
(45) Date of Patent: Nov. 10, 2026

(54) FLOOR STRUCTURE FOR A PASSENGER MOTOR VEHICLE AND MODULAR SYSTEM FOR A BODY OF A MOTOR VEHICLE

(71) Applicant: Mercedes-Benz Group AG, Stuttgart (DE)

(72) Inventor: Michael Carl, Gerlingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 426 days.

(21) Appl. No.: 18/558,864

(22) PCT Filed: May 3, 2022

(86) PCT No.: PCT/EP2022/061756

§ 371 (c)(1),
(2) Date: Nov. 3, 2023

(87) PCT Pub. No.: WO2022/233812

PCT Pub. Date: Nov. 10, 2022

(65) Prior Publication Data

US 2024/0239411 A1 Jul. 18, 2024

(30) Foreign Application Priority Data

May 4, 2021 (DE) ..................... 10 2021 002 367.6

(51) Int. Cl.
*B62D 25/02* (2006.01)
*B62D 21/15* (2006.01)
(Continued)

(52) U.S. Cl.
CPC ......... *B62D 21/157* (2013.01); *B62D 25/025* (2013.01); *B60R 16/04* (2013.01); *H01M 50/242* (2021.01); *H01M 2220/20* (2013.01)

(58) Field of Classification Search
CPC ... B62D 21/15; B62D 25/025; B62D 25/2036
See application file for complete search history.

(56) References Cited

U.S. PATENT DOCUMENTS 8,070,215 B2 12/2011 Yoshioka et al.
10,822,039 B2 * 11/2020 Shannon ............. B62D 21/157
(Continued)

FOREIGN PATENT DOCUMENTS

CN 204222971 U 3/2015
CN 104908818 A 9/2015
(Continued)

OTHER PUBLICATIONS

JP 2010-274848 and computer translation (Year: 2010).*
(Continued)

*Primary Examiner* — Gregory A Blankenship
(74) *Attorney, Agent, or Firm* — Crowell & Moring LLP

(57) ABSTRACT

A floor structure for a passenger car includes side sills which define at least one respective hollow space and which are connected to a vehicle floor. Crossmembers extend between the side sills. Respective energy absorption elements run along the side sills where the energy absorption elements have at least one non-linear longitudinal region in their longitudinal course.

9 Claims, 4 Drawing Sheets

(51) Int. Cl.

| | |
|---|---|
| *B60R 16/04* | (2006.01) |
| *H01M 50/242* | (2021.01) |

(56) References Cited

U.S. PATENT DOCUMENTS

| | | | | |
|---|---|---|---|---|
| 12,172,702 | B2 * | 12/2024 | Danneberg | B62D 21/157 |
| 2002/0167200 | A1 * | 11/2002 | Uchida | B62D 25/20 296/204 |
| 2010/0270830 | A1 * | 10/2010 | Maruyama | B62D 25/025 296/209 |
| 2011/0049937 | A1 | 3/2011 | Fujii et al. | |
| 2015/0258956 | A1 | 9/2015 | Sassi et al. | |
| 2015/0274101 | A1 | 10/2015 | Kaneko et al. | |
| 2017/0025655 | A1 | 1/2017 | Klimek et al. | |
| 2017/0050675 | A1 | 2/2017 | Kellner et al. | |
| 2018/0222535 | A1 * | 8/2018 | Tanabe | B62D 25/025 |
| 2018/0236863 | A1 * | 8/2018 | Kawabe | B60K 1/04 |
| 2020/0262491 | A1 | 8/2020 | Shannon et al. | |
| 2021/0101490 | A1 | 4/2021 | Yang et al. | |
| 2021/0170915 | A1 * | 6/2021 | Park | B62D 25/2036 |
| 2021/0221436 | A1 * | 7/2021 | Tsuyuzaki | B62D 25/025 |
| 2022/0016966 | A1 | 1/2022 | Kecalevic et al. | |
| 2023/0102921 | A1 * | 3/2023 | Odhekar | B62D 27/065 296/187.12 |
| 2023/0219626 | A1 * | 7/2023 | Kuipers | B62D 21/157 296/187.12 |
| 2023/0278636 | A1 * | 9/2023 | Munjurulimana | B62D 21/152 296/187.1 |
| 2024/0092426 | A1 * | 3/2024 | Park | B62D 27/065 |
| 2024/0239411 | A1 * | 7/2024 | Carl | B62D 25/2036 |
| 2024/0308593 | A1 * | 9/2024 | Kuipers | B62D 21/157 |
| 2025/0256780 | A1 * | 8/2025 | Qin | B62D 25/025 |
| 2025/0269903 | A1 * | 8/2025 | Jung | B62D 21/157 |
| 2025/0360964 | A1 * | 11/2025 | Kamemoto | B62D 21/03 |
| 2025/0376216 | A1 * | 12/2025 | Kamemoto | B62D 21/03 |
| 2026/0035038 | A1 * | 2/2026 | Marquez Duran | B62D 21/15 |
| 2026/0042485 | A1 * | 2/2026 | Urban | B62D 21/157 |

FOREIGN PATENT DOCUMENTS

| | | | |
|---|---|---|---|
| CN | 204623376 | U | 9/2015 |
| CN | 108394471 | A | 8/2018 |
| CN | 208264351 | U | 12/2018 |
| CN | 112606670 | A | 4/2021 |
| DE | 10 2010 049 581 | A1 | 4/2012 |
| DE | 10 2010 050 826 | A1 | 5/2012 |
| DE | 10 2012 206 032 | A1 | 10/2013 |
| DE | 20 2016 103 720 | U1 | 10/2016 |
| DE | 10 2018 132 258 | A1 | 6/2020 |
| EP | 2 468 609 | B1 | 6/2012 |
| JP | 2010-208473 | A | 9/2010 |
| JP | 2010-274848 | A | 12/2010 |
| WO | WO 2019/059821 | A1 | 3/2019 |
| WO | WO 2021/071410 | A1 | 4/2021 |

OTHER PUBLICATIONS

Chinese-language Office Action issued in Chinese Application No. 202280009516.5 dated Jul. 25, 2025 with partial English translation (13 pages).

English-language International Search Report (PCT/ISA/210) issued in PCT Application No. PCT/EP2022/061756 dated Sep. 9, 2022 (2 pages).

German-language Office Action issued in German Application No. 10 2021 002 367.6 dated Nov. 18, 2021 (4 pages).

German-language Office Action issued in German Application No. 10 2021 002 367.6 dated Aug. 19, 2022 (5 pages).

German-language Office Action issued in German Application No. 10 2021 002 367.6 dated Apr. 28, 2023 (4 pages).

* cited by examiner

FLOOR STRUCTURE FOR A PASSENGER MOTOR VEHICLE AND MODULAR SYSTEM FOR A BODY OF A MOTOR VEHICLE

BACKGROUND AND SUMMARY OF THE INVENTION

The invention relates to a floor structure for a passenger motor vehicle and a modular system for a body of a motor vehicle.

Such a floor structure is, for example, known from EP 2 468 609 B1 and comprises respective side sills, having a respective hollow space, which are connected to a vehicle floor on the sides and between which crossmembers extend. In order to thereby protect an energy storage device underneath the vehicle floor and extending between the side sills, in particular from a side impact, corresponding energy absorption elements are arranged along the respectively associated side sills. In the present case, these energy absorption elements are arranged on sides of the storage housing of the energy storage device and are formed, for example, as extruded or rolled profiles. From other embodiments it is also known to arrange such energy absorption elements, not on sides of the storage housing, but rather inside the hollow space of the respective side sill.

It is however common among all known floor structures that, for the necessary protection of the energy storage device in the case of a side collision, extremely large, energy absorption elements or profiles extending along the longitudinal vehicle axis, which are expensive in terms of weight and cost, are used, which, for example, occupy approximately the whole cross section of the hollow space of the respective side sill. This is, for example, due to the fact that the respective energy absorption element should be supported on the floor structure and/or the energy storage device on a large scale and across the whole extent of the floor structure in the vertical direction of the vehicle.

The object of the present invention is therefore to create a floor structure of the type cited at the beginning, which is as cost-optimized, weight-optimized and space-optimized as possible. In particular, the respective energy absorption element should be matched to the contour of the floor structure of the motor vehicle in an especially favorable manner.

The floor structure according to the invention comprises a side sill for each vehicle side, by means of which a respective hollow space is defined and which adjoin a vehicle floor arranged between the side sills. Between the side sills, respective crossmembers extend between the side sills, preferably above a base plate or similar of the vehicle floor. Respective profile-type energy absorption elements also extend along the side sills, which, according to the invention, have at least one non-linear, in particular a curved, bent or similar longitudinal region in their longitudinal course. By means of the partially non-linear or curved or bent formation of the respective energy absorption element, it is possible to match this especially favorably to the embodiment or contour of the body floor structure and to thus significantly improve the accident features of the vehicle or the occupant safety in the case of a side impact. It is thus for example and in particular possible to support the respective energy absorption elements that are on the sides in an improved manner on the respective crossmembers, which are preferably arranged at different heights relative to the vertical direction of the vehicle across the course of the floor structure in the longitudinal direction of the vehicle. By means of the correspondingly non-linear or curved course of the respective energy absorption elements, it can thus nevertheless be achieved that these are supported on the crossmembers arranged on the inner side of the energy absorption elements in the transverse direction of the vehicle in an optimal manner, preferably on all crossmembers which are arranged along the energy absorption elements in the longitudinal direction of the vehicle and extend between the side sills. Due to this improved support, both the components of the floor structure and also the energy absorption elements can be dimensioned smaller overall, which in turn contributes to saving weight and installation space as well as to a cost-effective production of the floor structure.

In a further embodiment of the invention it has been shown to be advantageous if the energy absorption elements are arranged inside the respectively associated hollow space of the corresponding side sill. Together with the respective side sills, respective side sill structures can thus be created by means of the energy absorption elements, which ensure a large-scale and favorable force absorption in the event of a side impact with a barrier or a vehicle.

In a further embodiment of the invention, a front and/or rear end region of the energy absorption elements is formed as a non-linear longitudinal region of the energy absorption element. This, for example, enables that the respective crossmembers are arranged in a central region of the vehicle floor above a base plate and in a front and/or rear region, for example under the vehicle floor or the corresponding base plate.

In this regard it has further shown itself to be advantageous if the front and/or rear end region of the energy absorption element is lowered downwards with respect to a central region. However, end regions of the energy absorption elements rising upwards would theoretically also be conceivable.

A further advantageous embodiment of the invention provides that the energy absorption elements extend in the central region at least substantially at the level of respective crossmembers running above the vehicle floor. In the central region of the energy absorption elements, the desired optimal support and force transmission of the respective energy absorption elements on the side towards the vehicle centre is thus achieved.

An equally favorable support of the respective energy absorption elements in the front or rear end regions is achieved if these run at the height of a respective crossmember running under the vehicle floor. Experience has shown that respective crossmembers are arranged under the vehicle floor or the base plate in the front and rear end region, for example in order to achieve a frame-like reinforcement of the floor structure together with the respective side sills.

In a further embodiment of the invention it has been shown to be advantageous if the energy absorption elements in the central region extend at least substantially above an energy storage device arranged under the vehicle floor and between the side sills. If the floor structure is therefore used for, for example, an electrically operated motor vehicle having an underfloor arrangement of an energy store, then respective crossmembers inside the energy store can be avoided or minimized by means of the corresponding course of the energy absorption elements, which in turn enables a saving on installation space and vehicle speed as well as a cost-effective embodiment of the energy store. The capacity inside the housing of the energy store usable for energy storage also thereby increases, whereby, for example, more battery cells are arranged inside the energy store or the storage housing, so that the vehicle range can also be increased in this manner.

In an especially advantageous embodiment of the invention is it provided that the respective energy absorption element associated with one of the two side sills and respectively extending approximately along the vehicle longitudinal axis does not extend solely straight, like the side sill in particular extends, rather has at least one curved region around the vehicle transverse axis, which, in the side view of the motor vehicle, results in a support/overlap region of the energy absorption elements that covers as much of the surface as possible on/with at least one crossmember structure running along the vehicle transverse axis between the two side sills above the installation space receiving the energy store and additionally at least one support/overlap region having a crossmember structure in front of the energy store installation space or at least one support/overlap region having a crossmember structure behind the energy store installation space. It can thereby be provided in a further embodiment that the support/overlap region of the energy absorption elements is located on/with a crossmember structure in front of the energy store installation space or the support/overlap region of the energy absorption elements is located on/with a crossmember structure behind the energy store installation space in the vertical direction of the vehicle under the support/overlap region of the energy absorption elements on/with the crossmember structures above the energy store installation space.

Finally, it has also been shown to be advantageous if the height of the side sill at least substantially corresponds to the tripled height of the energy absorption elements. A further optimization of the floor structure hereby arises, since the energy absorption elements develop an optimal effectiveness despite their low vertical extension.

It has furthermore been shown to be advantageous if the height of the energy absorption elements at least substantially corresponds to the height of the crossmember structures above the vehicle floor. A further optimization of the floor structure hereby arises, since the energy absorption elements can develop an optimal effectiveness despite their low vertical extension.

The subject of the invention also relates to a modular system, which serves for the strengthening of both side sills or of the side sill structure of the motor vehicle body at the positions necessary for the protection of the respective energy store, in particular in the case of motor vehicles which are based on a shared body platform but, compared to the basic vehicle, i.e., the body of the basic vehicle from which the body of the at least one other motor vehicle of this model range is created by means of modifications to the body, one of the vehicles, for example, has to meet increased requirements regarding vehicle mass, high-voltage safety (for example protection of electrical components of electric vehicles), occupant safety or dimensional concept variations (for example wheelbases), in that the energy absorption elements can be adapted to the resulting various locations of the crossmember structures by means of variation of the number and shape of the curved regions, whereby the vehicle safety is improved in the case of a side impact with another party involved/crash barrier in a weight and cost-optimal manner, in that the size and location of the support/covering regions of the energy absorption elements on the crossmembers/crossmember structures can be optimized and thus an intrusion of the body structure into the energy store installation space during the impact can be prevented. The embodiment of the respective floor structure of the motor vehicle body is preferably carried out according to one or more of the claims for the floor structure and/or from the description of the figures.

In an advantageous embodiment variant of the modular system it is provided that all construction variant-specific energy absorption elements of the respective construction variants of the floor structure of the motor vehicle have a non-linear longitudinal region. If an internal combustion engine-operable construction variant is provided, alternatively to this, its side sills can optionally also be provided with energy absorption elements or be associated with the side sills, which have a linear longitudinal course in their longitudinal course, since here, due to a for example lower weight of the motor vehicle compared to an electrically operable motor vehicle having an energy store, there are not such high requirements on the body for, for example, a side impact.

Further advantages, features and details of the invention can be seen in the following description of preferred exemplary embodiments and by reference to the drawings. The features and feature combinations referred to in the description, as well as the features and feature combinations referred to below in the description of the figures and/or shown solely in the figures can be used not only in each specified combination but also in other combinations or alone without leaving the scope of the invention.

DETAILED DESCRIPTION OF THE DRAWINGS

Figure 1A:
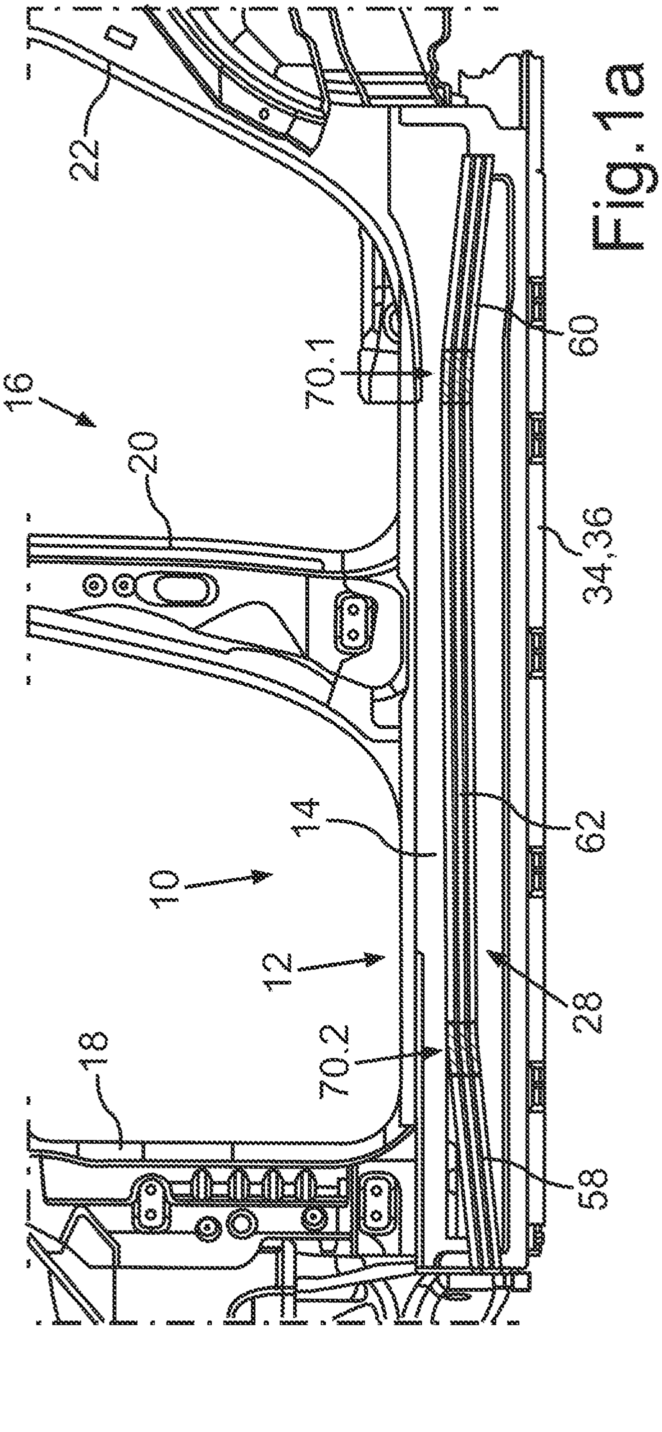
FIGS. 1*a*, 1*b* respectively show cut-away side views of a body of a present, for example electrically operated, motor vehicle having a floor structure according to the invention and having an energy storage device arranged underneath a vehicle floor, wherein respective energy absorption elements run inside corresponding hollow spaces of the side sills on the corresponding side and have a respective, non-linear or curved longitudinal region in their longitudinal course or between front and rear end regions, wherein in FIG. 1*a* an internal partial shell of the respective side sill is shown, which is omitted in FIG. 1*b* for the sake of clarity.
Figure 1B:
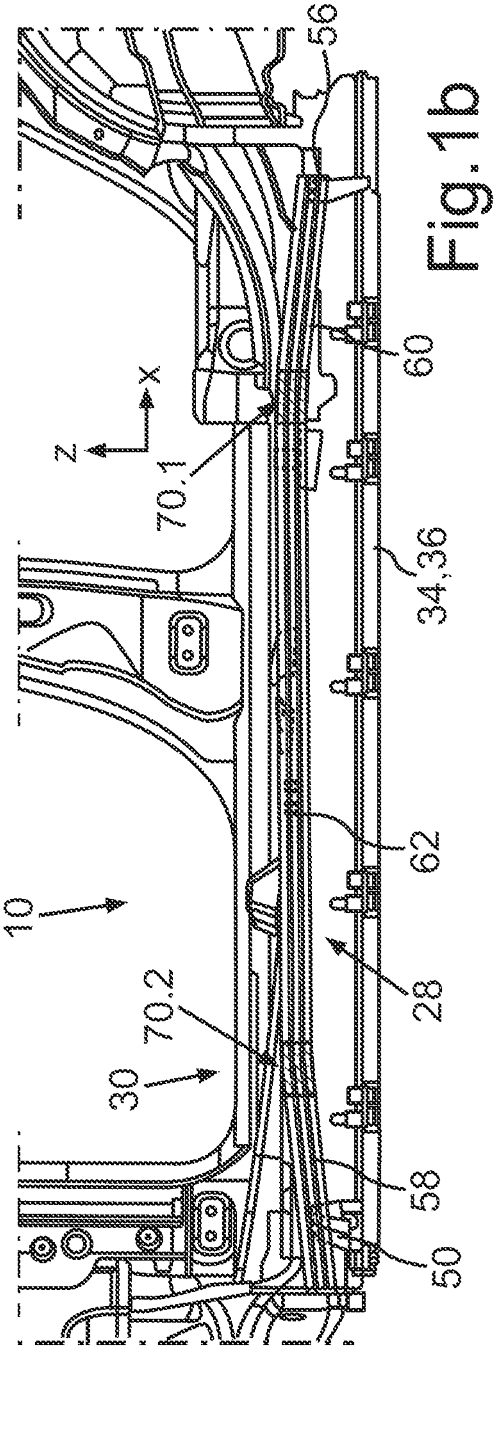

In FIGS. 1*a* and 1*b* a body of an, in this exemplary embodiment, electrically operated passenger motor vehicle is respectively represented in a cut-away side view. A floor structure 10 having a side sill 12 arranged on the corresponding vehicle side is hereby recognizable, of which only an inner partial shell 14 is here represented in FIG. 1*a*. This partial shell 14 belongs to a side wall 16 of the body, which also comprises an A pillar 18, a B pillar 20 as well as a C pillar 22.

Figure 3:
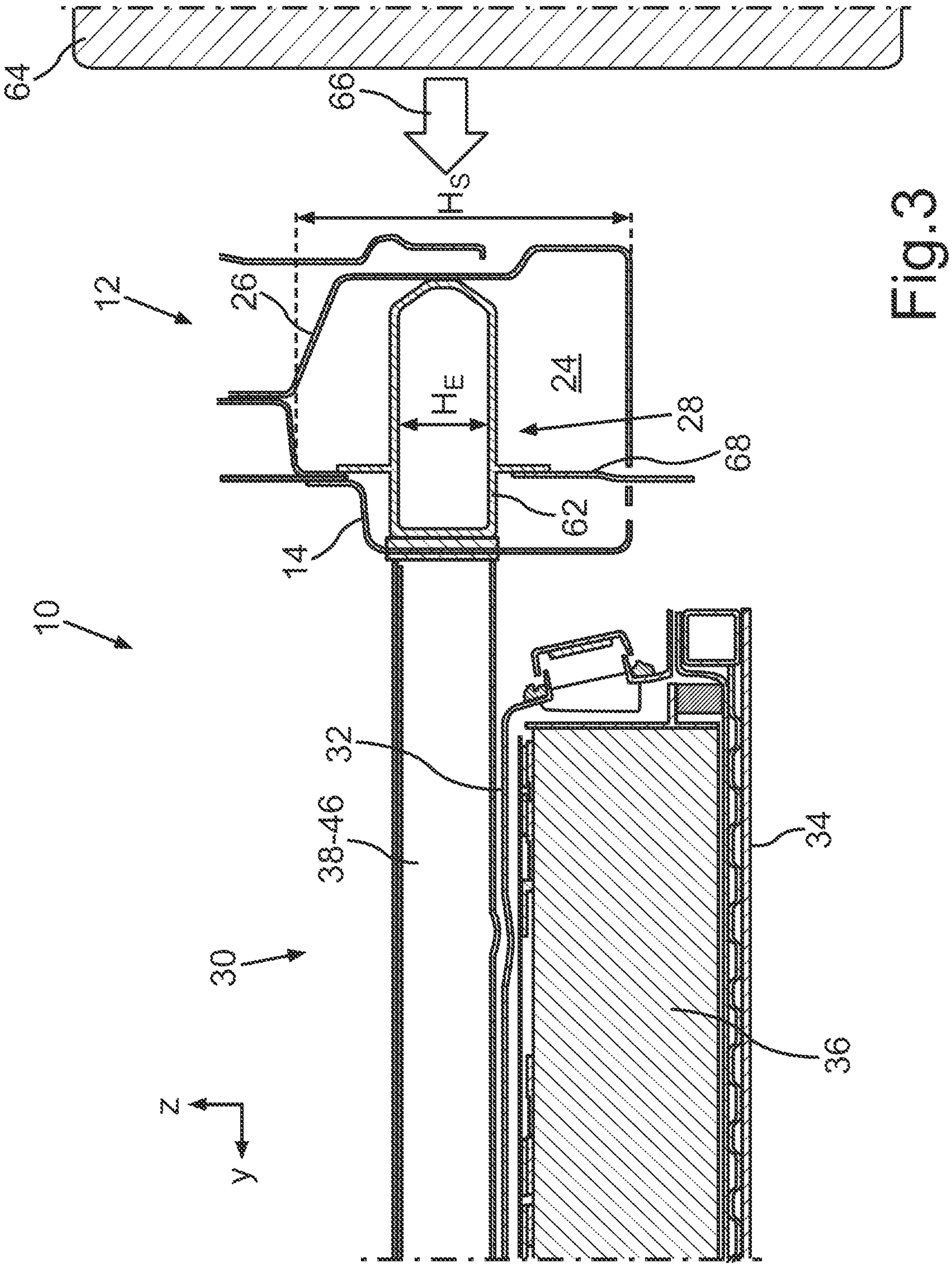
FIG. 3 shows a cut-away and schematic side view along a sectional plane through the floor structure according to FIGS. 1*a* to 2*b*, running in the transverse direction of the vehicle or in the vertical direction of the vehicle, wherein the arrangement of the corresponding energy absorption element is recognizable inside the associated side sill on the side as well as its support on the respective crossmember towards the centre of the vehicle.

Together with FIG. 3, which shows the corresponding region of the floor structure 10 in a cut-away side view along a sectional plane running in the transverse direction of the vehicle (y direction) or in the vertical direction of the vehicle (z direction), it can be seen that an energy absorption element 28 is arranged inside a respective hollow space 24 of the side sill 12 on the corresponding side, which is formed by the partial shell 14 on one side and by an outer shell 26 on the other side. This energy absorption element 28 extends—as can be seen in FIG. 1*a*—at least approximately across the whole length of the side sill 12 or of a vehicle floor 30, from which, together with FIG. 1*b* and FIG. 3, a base plate 32 can be seen, underneath which a storage housing 34 of an energy storage device 36 for the electrical drive of the passenger motor vehicle is arranged.

Figure 2A:
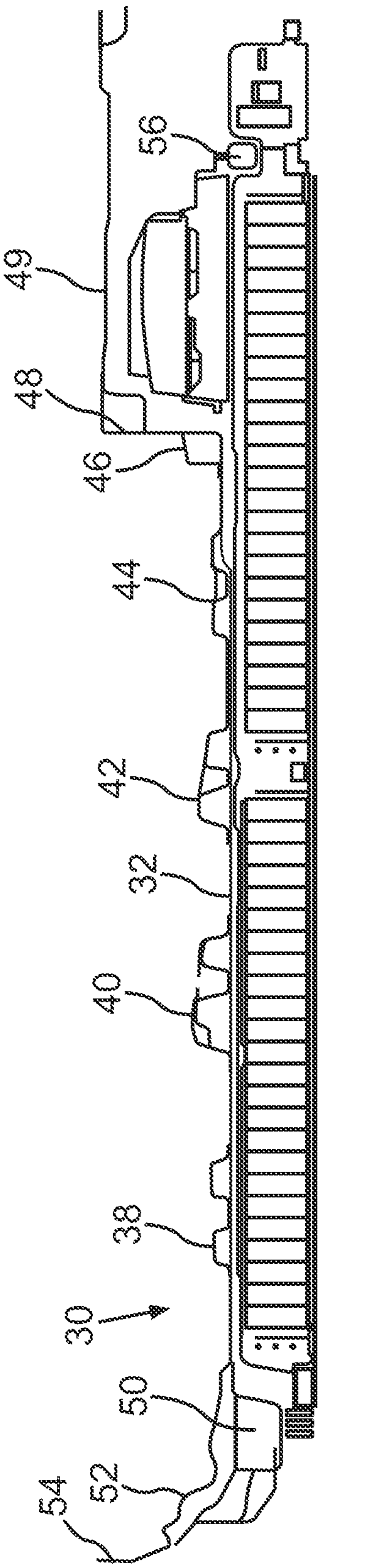
FIGS. 2*a*, 2*b* respectively show cut-away side views of the floor structure according to FIGS. 1*a* and 1*b*, wherein in FIG. 2*a* respective crossmembers of the floor structure are also recognizable, which run between the side sills in the transverse direction of the vehicle and are arranged above a base plate in a central region and under this base plate in the front and end regions and wherein, in FIG. 2*b*, the course of the respectively corresponding energy absorption element on the side is also represented.
Figure 2B:
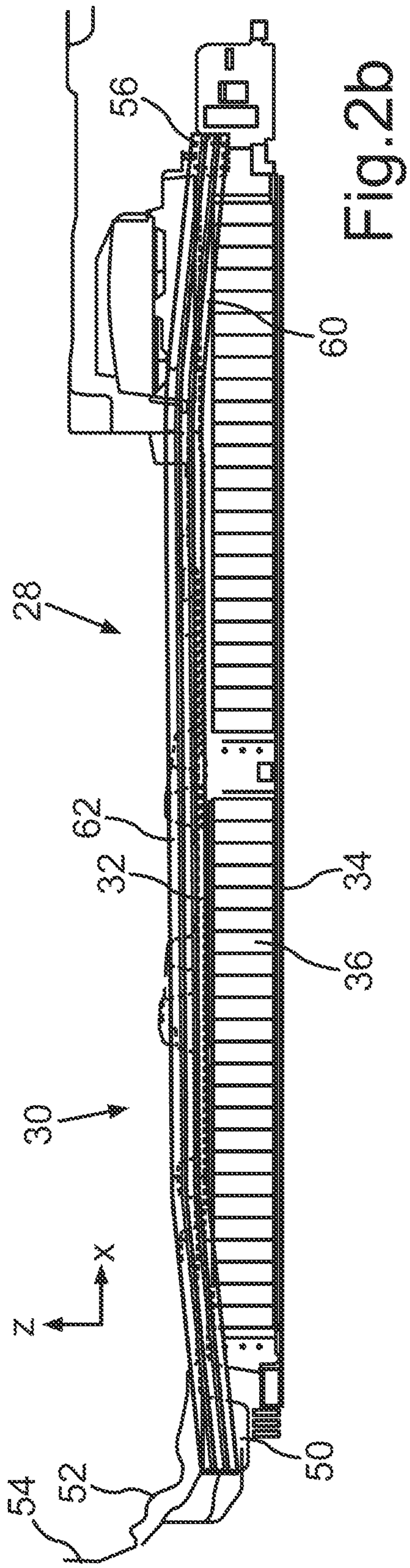

From FIGS. 2*a* and 2*b*, which respectively substantially only show the vehicle floor 30 of the floor structure 10 having the storage housing 34 of the energy storage device 36 arranged under the base plate 32, it can be seen that a plurality of crossmembers 38, 40, 42, 44, 46 are provided in a central region of the floor structure 10 relative to the longitudinal direction of the vehicle (x direction), which all extend in the transverse direction of the vehicle (y direction) and horizontally between the side sills 16 arranged on both vehicle sides and—as can in particular be seen in FIG. 3—adjoining the partial shell 14 of the side sill 12 on the inside.

In the region of the rear crossmember 46, the vehicle floor 30 merges into a rear floor 49 in a step 48.

As is further in particular recognizable from FIGS. 1*b* and 2*a*, a crossmember 50 is arranged in front of the storage housing 34 of the energy storage device 36, which also runs horizontally and in the transverse direction of the vehicle (y direction) and is arranged under the base plate 32. More precisely, the crossmember 50 is located under a region where the base plate 32 transitions to a pedal base 52 and from there into an end wall 54, which separates the passenger compartment of the motor vehicle from a front structure.

In the rear region, a crossmember 56 is also provided, which is arranged under the rear floor 49 or under an imaginary extension of the base plate 32. In this region, the storage housing 34 can be omitted for the course of the crossmember 56.

As is now in particular recognizable from FIGS. 1*a*, 1*b* and 2*b*, the respective energy absorption element 28 arranged inside the hollow space 24 does not have a straight-line, linear course, but rather is here formed non-linearly in its longitudinal course and, in this exemplary embodiment, comprises three longitudinal regions in total, namely a central region 62, to which a respective end region 58 or 60 adjoins. While the central region 62 is formed straight and runs parallel to the longitudinal vehicle axis, the front and the rear end regions 58, 62 run diagonally to the straight-line central region 62 of the energy absorption element. Both end regions 58, 60 can thereby be formed separately from the central region 62 or formed integrally with the central region 62 and correspondingly reshaped. It is hereby, for example, conceivable to form the energy absorption element 28 as a single or multi-chamber extrusion profile, wherein the respective end regions 58, 60 are attached on the central region 62, or alternatively the extrusion profile is formed in one piece and has been correspondingly reshaped in the front and rear region. The longitudinal regions or end regions 58, 60, which are non-linear compared to the central region 62 are thereby, for example, formed as arc-shaped, curved sections or alternatively as regions that run linearly in themselves, which are arranged at a corresponding angle to the central region 62 and are connected with each other via non-linear transition regions 70.1 and 70.2. These transition regions 70.1 and 70.2 are thus the places on the energy absorption element 28 at which this has a non-linear longitudinal course and the end regions 58, 60 are slanted compared to the central region 62 such that the central longitudinal axes of the end region 58, 60 are not aligned with the central longitudinal axis of the straight central region 62, rather run at an angle of greater than 0° to this.

It is to be considered as comprised in the scope of the invention that the energy absorption elements 28 can also be produced from another material than a metal material suited for extrusion. In particular, plastic components or hybrid components with metal materials and plastics or steel-rolled profiles joined with each other are also conceivable.

The central region 62 of the energy absorption element 28 on the respective vehicle side thereby extends at least substantially above the base plate 32, to the height of the crossmembers 38 to 46 in the vehicle vertical direction (z direction), and thus also in line above the storage housing 34 of the energy storage device 36. This has, on the one hand, the advantage that the central region 62 of the energy absorption element 28 can have a low height $H_E$ (FIG. 3B), which substantially corresponds to the height of the respective crossmembers 38 to 46, and is nevertheless optimally supported towards the vehicle centre due to the height in the vertical direction of the vehicle (z direction) overlapping with the respective crossmembers 38 or 46 in an optimal manner, if a barrier 64 represented in FIG. 3 or a vehicle or similar meets the floor structure with a force 66 in a side impact. By means of the height of the energy absorption element 28, and in particular of its central region 62, substantially above the energy storage device 36, the installation of crossmembers inside the storage housing 34 can additionally be avoided. A large installation space and weight saving hereby arises on the one hand, and a simple embodiment of the storage housing 34 on the other. Nevertheless, an optimal support of the respective energy absorption element 28 in the transverse direction of the vehicle (y direction) is given, which can thus ensure an optimal side impact protection.

As can in particular be seen from FIGS. 1*b* and 2*b*, the course of the end regions 58, 60 that is realized by means of the non-linear transition regions 70.1 and 70.2 and altered compared to the central region 62 enables the end regions 58 and 60 also to be arranged overlapping the respective crossmember 50 or 56 that runs in the front or in the rear region of the floor structure 10. In a front region of the floor structure 10, there is thus an optimal support of the front end region 58 of the energy absorption element 28 on the crossmember 50, which is arranged under the base plate 32. Similarly, there is an optimal support of the rear end region 60 of the energy absorption element 28 in the rear region of the floor structure 10, which also runs at least substantially over the energy storage device 36 in this region.

In particular together with FIG. 3 it is additionally recognizable that a height $H_S$ of the respective side sill 12 substantially corresponds to the tripled height of $H_E$ of the respective energy absorption element 28. The height $H_E$ of the energy absorption element 28 is therefore much lower than the height $H_S$ of the corresponding side sill 12 inside its hollow space 24 which is arranged in the energy absorption element 28. In the present case, the energy absorption element 36 extends across approximately the whole width of the side sill 12 and is locally held inside the hollow space 24 of the side sill 12 by means of a corresponding sheet metal part 68, which runs substantially in the vertical direction of the vehicle (z direction) and in the longitudinal direction of the vehicle (x direction). The sheet metal part 68 thus serves for positioning and positional fixing of the energy absorption element 28 inside the side sill 12.

Figure 4:
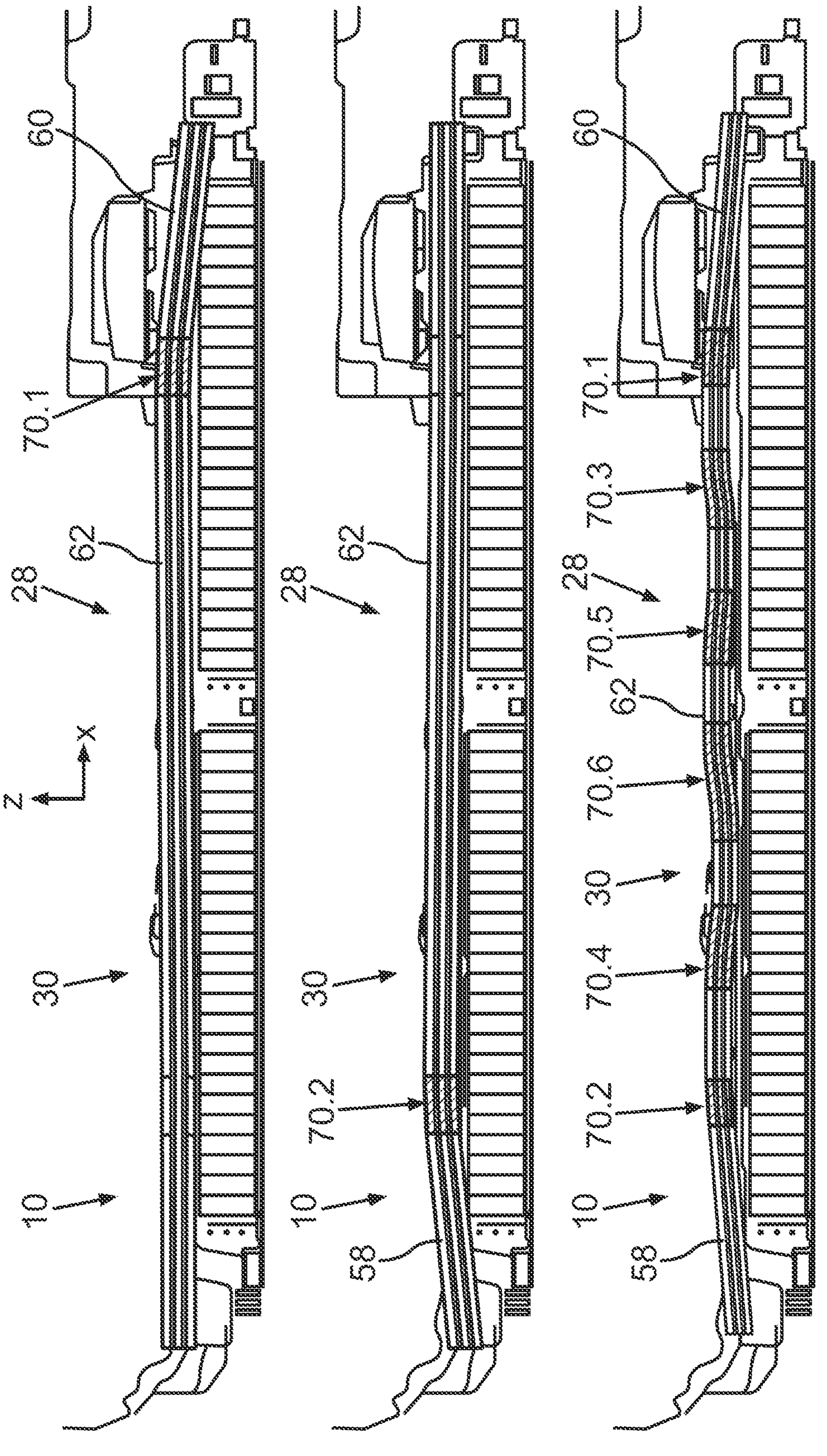
FIG. 4 shows respective side views of the energy storage device under the vehicle floor of the floor structure, similarly to FIGS. 2*a* and 2*b*, wherein different designs of the respective energy absorption element on the side are indicated.

In FIG. 4, similarly to FIGS. 2*a* and 2*b*, further embodiments of the corresponding energy absorption element 28 on the side of each vehicle side are recognizable in respective side views. In particular it is thereby again made clear by means of the two representations above that in particular a respective front or rear end region 58, 60 preferably forms the longitudinal course of the energy absorption element 28 that is non-linear compared to the central region 62 (this embodiment is not represented) or—as is provided in the represented exemplary embodiments according to the upper and middle illustration of FIG. 4—that a respective front or rear linear end region 58, 60 are connected with the central region 62 by means of non-linear transition regions 70.1 or 70.2, while the end regions 58, 60, seen for themselves, in turn have a straight/linear longitudinal course.

In FIG. 4, the bottom illustration shows an exemplary embodiment of the energy absorption element 28 wherein this is curved multiple times in the central region 62 or is provided with respective non-linear longitudinal regions 70.1 to 70.6, while the longitudinal regions 70 running between these non-linear longitudinal regions 70.1 to 70.6 respectively have or can have a straight longitudinal course in each case. By means of the respective longitudinal regions or curving regions, a still more optimal adaptation of the energy absorption element 28 to the respective arrangement of the crossmembers 38 to 46 in the vertical direction of the vehicle (z direction in the vehicle coordinate system) can thus occur.

It is therefore altogether recognizable that a sill structure with associated energy absorption elements 28 that is as optimal as possible in terms of cost, weight and installation space can be provided by means of the floor structure according to the invention, which, matched to the contour of the vehicle floor 30 or the floor structure 10, generally both protects the respective energy store 36 in an optimal manner and improves the occupant safety in the case of a side impact. The floor structure or the associated energy absorption elements 28 can thereby be adapted to different energy stores in an optimal manner. It is therefore not only possible to adapt the floor structure 10 to an energy storage device 36 for an electrical drive, rather it can also similarly be used, for example, for a fuel tank, for example for fuel cells.

In particular in vehicles with increased vehicle weight, additional crossmember structures can be avoided inside the energy store 36 or the storage housing 34. By means of the formation of the respective energy absorption element 28 that is non-linear or curved at least in one longitudinal region, a supporting and covering with the crossmember over the energy store 36 that covers as much of the surface as possible can be achieved.

A modular system can additionally be provided, which can be used for the strengthening of the respective side sills 12 and their energy absorption elements 28 in the positions necessary for the protection of the respective energy store 36, and indeed in particular in the case of vehicles which are based on a shared body platform, but which, compared to the basic vehicle, have to meet increased requirements regarding vehicle mass, high-voltage safety (for example protection of electrical components of electric vehicles), occupant safety or dimensional concept variations (for example wheelbases). This occurs in that the energy absorption structure and its energy absorption elements 28 are adapted to the resulting various positions of the crossmember structures by means of variation of the number and shape of the non-linear curving regions, whereby the vehicle safety in the case of a side impact with another party involved/a crash barrier 64 is improved in a weight-optimal and cost-optimal manner. To this end, the size and position of the support/covering regions between the energy absorption structure and its energy absorption elements 28 and the crossmember structure is optimized and thus prevents an intrusion of the floor structure into the installation space of the energy store 36 during the impact.

In summary, it remains to be noted that, in the context of the present invention, an energy absorption element having at least one non-linear longitudinal region over its longitudinal course is to be understood to be an elongated profile component which has no straight central longitudinal axis, but rather is formed or shaped such that at least two longitudinal regions are formed, the central longitudinal axes of which are not arranged aligned. These are diagonal to each other in the case of respective straight longitudinal regions seen for themselves and enclose between them an angle or—if one of these non-linear longitudinal regions is formed curved and its central longitudinal axis therefore has a correspondingly curved course—the non-linear longitudinal region protrudes upwards or downwards from the linear longitudinal region corresponding to its course. It is important that the respective energy absorption element is formed across its longitudinal course such that the energy absorption element is arranged in the transverse direction of the vehicle and vertical direction of the vehicle overlapping, preferably at least partially overlapping, in particular complete overlapping, with crossmembers arranged in the base region of the body, which are in turn arranged at different height levels relative to an imagined horizontal, for example a road located under the vehicle.

The invention claimed is:

1. A floor structure (10) for a passenger car, comprising:

a first side sill (12) that defines a first cavity (24) and a second side sill (12) that defines a second cavity (24), wherein the first side sill (12) and the second side sill (12) are laterally connected to a vehicle floor (30);

a plurality of crossbeams (38-46, 50, 56) which extend between the first side sill (12) and the second side sill (12); and a first energy absorption element (28) which runs along the first side sill (12) and extends over an entire length of the first side sill (12) and a second energy absorption element (28) which runs along the second side sill (12) and extends over an entire length of the second side sill (12);

wherein the plurality of crossbeams (38-46, 50, 56) are arranged at different heights in a vertical direction of the passenger car across a course of the floor structure in a longitudinal direction of the passenger car;

wherein the first energy absorption element (28) and the second energy absorption element (28) each have a respective non-linear longitudinal region (58; 60; 70.1 to 70.6) in a longitudinal course which is configured such that the first energy absorption element (28) and the second energy absorption element (28) are arranged in a transverse direction of the passenger car and in the vertical direction of the passenger car at least partially overlapping with the plurality of crossmembers (38-46, 50, 56);

wherein a height ($H_S$) of the first side sill (12) and the second side sill (12) corresponds at least substantially to a tripled height ($H_E$) of the first energy absorption element (28) and the second energy absorption element (28).

2. The floor structure (10) according to claim 1, wherein the first energy absorption element (28) is arranged inside the first cavity (24) and the second energy absorption element (28) is arranged inside the second cavity (24).

3. The floor structure (10) according to claim 1, wherein the the first energy absorption element (28) and the second energy absorption element (28) each have, in the longitudinal course, a central region (62), a front end region (58), and a rear end region (60) and wherein the front end region (58) and the rear end region (60) are connected with the central region (62) by a respective non-linear transition region (70.1 to 70.6).

4. The floor structure according to claim 3, wherein the front end region (58) and the rear end region (60) are non-linear with respect to the central region (62).

5. The floor structure (10) according to claim 4, wherein the front end region (58) and the rear end region (60) are lowered downwards with respect to the central region (62).

6. The floor structure (10) according to claim 3, wherein the first energy absorption element (28) and the second energy absorption element (28) extend in the respective central region (62) at least substantially at a level of crossmembers (38-46) of the plurality of crossmembers (38-46, 50, 56) that run above a base plate (32) of the vehicle floor (30).

7. The floor structure (10) according to claim 3, wherein the first energy absorption element (28) and the second energy absorption element (28) run with the respective front end region (58) at a level of a crossmember (50) of the plurality of crossmembers (38-46, 50, 56) that runs underneath a base plate (32) of the vehicle floor (30).

8. The floor structure (10) according to claim 3, wherein the first energy absorption element (28) and the second energy absorption element (28) run with the respective rear end region (60) at a level of a crossmember (56) of the plurality of crossmembers (38-46, 50, 56) that runs underneath the vehicle floor (30).

9. The floor structure (10) according to claim 1, wherein the first energy absorption element (28) and the second energy absorption element (28) run in the respective central region (62) at least substantially above an energy storage device (34) arranged underneath the vehicle floor (30) and between the first side sill (12) and the second side sill (12).

* * * * *